(12) United States Patent
Hiratsuka

(10) Patent No.: US 7,385,887 B2
(45) Date of Patent: Jun. 10, 2008

(54) ADDRESS SIGNAL POSITION DETECTION APPARATUS, OPTICAL DISK PLAYBACK APPARATUS, AND ADDRESS SIGNAL POSITION DETECTION METHOD

(75) Inventor: Takashige Hiratsuka, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 511 days.

(21) Appl. No.: 10/981,529

(22) Filed: Nov. 5, 2004

(65) Prior Publication Data
US 2005/0099911 A1   May 12, 2005

(30) Foreign Application Priority Data
Nov. 7, 2003 (JP) ............... 2003-378748

(51) Int. Cl.
G11B 7/00 (2006.01)
(52) U.S. Cl. ............... 369/44.26; 369/44.36; 369/44.34
(58) Field of Classification Search ............... None
See application file for complete search history.

(56) References Cited

U.S. PATENT DOCUMENTS

| | | | |
|---|---|---|---|
| 6,091,699 A | | 7/2000 | Nakane et al. |
| 6,266,305 B1* | | 7/2001 | Buchler ............... 369/44.32 |
| 6,381,201 B1 | | 4/2002 | Shihara et al. |
| 6,388,964 B2* | | 5/2002 | Watabe ............... 369/44.26 |
| 6,700,842 B1* | | 3/2004 | Nishi ............... 369/44.41 |
| 6,717,894 B2 | | 4/2004 | Kawashima |
| RE39,067 E | | 4/2006 | Ishibashi et al. |
| 2002/0039331 A1* | | 4/2002 | Park ............... 369/44.26 |
| 2003/0048705 A1* | | 3/2003 | Wang et al. ............... 369/44.26 |

FOREIGN PATENT DOCUMENTS

| | | |
|---|---|---|
| CN | 1273413 A | 11/2000 |
| JP | 11-191220 | 7/1999 |
| JP | 11-288548 | 10/1999 |
| JP | 2000-200422 | 7/2000 |
| JP | 2000-315327 | 11/2000 |
| KR | 2000-0062718 | 10/2000 |

OTHER PUBLICATIONS

Partial English translation of Office Action dated Jun. 29, 2007 for corresponding Chinese Application No. 200410092251.3.

* cited by examiner

Primary Examiner—Wayne Young
Assistant Examiner—LaTanya Bibbins
(74) Attorney, Agent, or Firm—Wenderoth, Lind & Ponack, L.L.P.

(57) ABSTRACT

The address signal position detection apparatus comprises a photodetector, a first and second adders which generate, from the output signals from the photodetector, two signal sequences whose phases change from each other according to a tracking error of a light spot, a phase difference detection circuit for detecting the phase difference from the two signal sequences, and a phase difference signal processing unit which generates an address signal position using the phase difference signal detected by the phase difference detection circuit, and detects an address signal position by providing threshold values with respect to the detected phase difference, thereby enabling a stable detection of the address signal position even when a DC symmetry in a difference signal of a reproduced signal is imperfect in an optical disk using the land/groove recoding method.

9 Claims, 14 Drawing Sheets

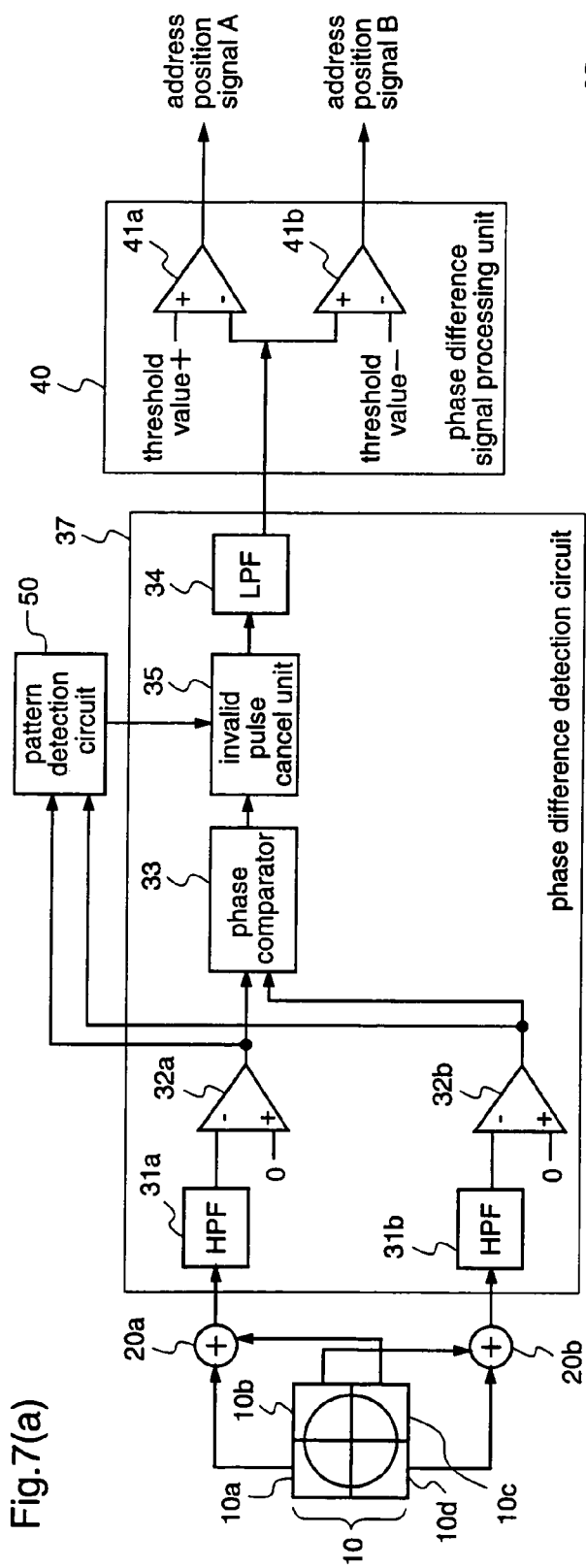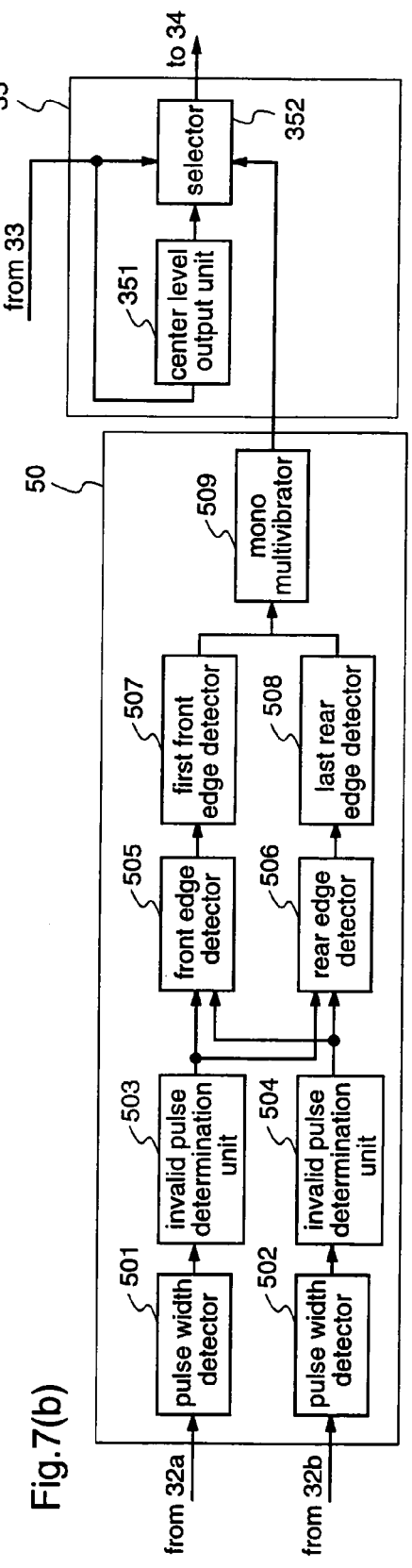
Fig.7(a)
Fig.7(b)

ADDRESS SIGNAL POSITION DETECTION APPARATUS, OPTICAL DISK PLAYBACK APPARATUS, AND ADDRESS SIGNAL POSITION DETECTION METHOD

FIELD OF THE INVENTION

The present invention relates to an address signal position detection apparatus, an optical disk playback apparatus, and an address signal position detection method, and more particularly to an address signal position detection apparatus which detects a position of an address signal portion in an optical disk medium in which signals are recorded on both a recessed recording track formed by a guide groove and a projecting recording track formed between the guide grooves, and further each of the recording tracks is composed of the integer number of recording sectors each having the same length, and the address signal portion including information such as track address is added to a head portion of each of the recording sectors, and an optical disk playback apparatus including the same as well as an address signal position detection method.

BACKGROUND OF THE INVENTION

In an optical disk medium using a land/groove recording method, which is typified by a DVD-RAM (Digital Versatile Disk Random Access Memory), signals are recorded on both a recessed recording track formed by a guide groove and a projecting recording track formed between the guide grooves, and further each of the recording tracks is composed of the integer number of recording sectors each having the same length. Further, an address signal portion including information such as track address is added to a head portion of each of the recording sectors. For this type of optical disk medium, a position of an address signal is detected, thereby performing processing such as determining a tracking polarity.

An example thereof is disclosed in Japanese Patent Registration No. 3073744 (Pages 11 and 12, and FIG. 11).

Hereinafter, a prior art address signal position detection apparatus disclosed in the above-described prior art document will be described.

FIG. 11 is a diagram illustrating a track layout of this type of optical disk medium using the land/groove recording method. FIG. 11 shows a disposition of tracks and recording sectors in one zone and a construction of the recording sectors. As shown in FIG. 11, a track of a groove portion (hereinafter, also referred to as a groove or a recessed portion) shown as black in FIG. 11 (hereinafter, referred to as a groove track), and a track of a portion between grooves (hereinafter, also referred to as a land or a projecting portion) shown as white in FIG. 11 (hereinafter, referred to as a land track) are alternately connected once for every track on the disk, thereby forming a spiral recording track. Further, a recording track is composed of the integer number of recording sectors, and a preformatted address signal portion is added to a head portion of each of the sectors. The preformatted address signal portion is recorded when the optical disk recording medium is manufactured. The address signal portion is composed of two parts of a forward part and a rearward part with respect to the scanning direction. The forward part is displaced from the groove portion onto the outer circumference side on the disk medium by half the groove width and disposed, and the rearward part is displaced from the groove portion onto the inner circumference side on the disk medium by half the groove width and disposed.

An address of a groove portion is added to a forward part of an address signal portion of the groove portion, which is disposed in the address signal portion just before the information recording portion thereof and displaced from the center of the groove portion onto the outer circumference side by half the groove width. On the other hand, an address of a portion between grooves is added to a rearward part of an address signal portion, which is disposed in the address signal portion just before an information recording portion of a recording track of a groove portion on the outer circumference side of the recording track of the portion between grooves by one track and displaced from the center of the groove portion onto the inner circumference side by half the groove width. Consequently, the address of the portion between grooves is added to a rearward part of an address signal portion of a groove portion, which is disposed in an address signal portion just before the information recording portion thereof and displaced from the center of the portion between grooves onto the outer circumference side by half the groove width.

Next, the address signal portions for connecting parts each connecting a land and a groove for every track on the disk, and which parts are aligned in the radial direction of the disk, will be described.

In a recording sector just after a connection point between a recording track of a groove portion and a recording track of a portion between grooves, as the disposition of the address signal in the address signal portion thereof, a forward part is displaced from the groove portion onto the outer circumference side by half the groove width and disposed, just as with the disposition of address signals except in the boundaries. A rearward part is displaced from the groove portion onto the inner circumference side by half the groove width and disposed. An address of the groove portion is added to the forward part of the address signal portion, which is displaced from the groove portion just before the information recording portion thereof onto the outer circumference side by half the groove width and disposed, just address values are added except in the boundaries. On the other hand, an address of the portion between grooves is added to the rearward part of the address signal portion, which is displaced from the portion between grooves just before the information recording portion thereof onto the outer circumference side by half the groove width and disposed.

As described above, a first part which is a part of an address signal is displaced from the center of the groove portion into one radial direction, for example, onto the outer circumference side, by a given distance, and disposed, while a second part which is the other part of the address signal is displaced from the center of the groove portion into the other radial direction, that is, such as onto the inner circumference side, by the same distance as the give distance, and disposed, and when the disk is played back, a tracking error signal, that is, a difference signal of a tracking sensor in the radial direction (in the direction of radius) is binarized by two comparators each having a different threshold value from each other to detect the change. This enables tracking polarities of the respective recording sectors to be determined, thereby detecting a connecting point between a land track and a groove track.

The method for detecting the address signal position is disclosed in the above-described prior art document, and FIG. 12 shows a timing chart for the detection disclosed in the prior art document.

The disposition of grooves and preformatted address signals is shown as the signal disposition on the disk surface in FIG. 12. The first half part of the address signal of the groove portion is displaced from the center of the groove onto the outer circumference side by half the track pitch and disposed, while the latter half part is displaced from the center of the groove onto the inner circumference side by half the track pitch and disposed. Thereby, the address signal dispositions are different between a boundary sector portion at which a land track and a groove track are connected and another normal sector portion as is shown by the signal disposition on the disk surface in FIG. 12. Here, a difference between output signals from photoreceptors of a pickup is taken, thereby obtaining a difference signal used for push-pull tracking servo system like the difference signal shown in FIG. 12.

Then, two levels of threshold values, Lth and Rth, are provided for the comparators respectively so as to detect that prepits are displaced into the left and the right with respect to the direction of travel of a light beam by half the track pitch in the address signal portion, respectively. Thereby, a binarized signal L0 indicating that a tracking of the light beam is displaced into the left side (the inner circumference side) with respect to the tracing direction shown in FIG. 12 and a binarized signal R0 indicating that the tracking of the light beam is displaced into the right side (the outer circumference side) are generated. When the difference signal level is Lth or more, L0 is Hi, while when the difference signal level is Lth or less, L0 is Lo. On the other hand, when the difference signal level is Rth or less, R0 is Hi, while when the difference signal level is Rth or more, R0 is Lo. The states of L0 and R0 are as shown by L0 and R0 in FIG. 12.

As for the address signal, since the groove is modulated by the information and discontinued, and takes a form of pit string, the two binarized difference signals L0 and R0 from the difference signal waveform generation unit (not shown) also have waveforms which are modulated by data signal frequency. Then, each of the pit string waveforms is corrected so as to become a waveform of one consecutive pulse in the first half part and the latter half part of the address signal, with using such as a retriggerable mono multivibrator, in order to be able to detect the presence or absence of the first half part and the latter half part of the address signal on the basis of the two input binarized difference signals. L0 is corrected to generate a binarized corrected difference signal L1 and R0 is corrected to generate a binarized corrected difference signal R1. The states of these corrected difference signals L1 and R1 are as shown by L1 and R1 in FIG. 12, respectively.

However, when the prior art address signal position detection apparatus is constructed as described above, there is a problem that when a DC symmetry is imperfect in the difference signal used for the detection between the forward part and the rearward part of the address information portion, a stable detection of address position cannot be made.

FIG. 13 is a diagram illustrating an address position detection signal in the case of the DC symmetry being imperfect between the forward part and the rearward part of the address information portion. A reflected light of a light spot obtained by applying a light onto a track of an optical disk medium is received, thereby obtaining output signals s100, s101, s102, and s103 shown in FIG. 13. The output signals are obtained with using a photodetector 10 comprising photoreceptors 10a, 10b, 10c, and 10d which are divided into four so as to form a cross-in-square shape as shown by signals on the disk surface in FIG. 13. The prior art apparatus is constructed so as to obtain a difference signal used for detecting an address position by subtracting the sum of outputs from the photoreceptors 10b and 10c in the photodetector 10 from the sum of outputs from the photoreceptors 10a and 10d in the photodetector 10. The difference signal corresponding to the first half part of the address information portion has a DC offset smaller than the difference signal corresponding to the latter half part and the DC symmetry is imperfect between the first half part and the latter half part of the address information portion as shown by the waveform of the difference signal in FIG. 13.

The symmetry of the difference signal becomes imperfect because a deviation of an optical axis with respect to a light reflected on the signal surface of the optical disk medium and the like occur due to such as variations in pickups at the manufacturing, and thereby offsets occur in the output signals s100, s101, s102, and s103 from the photoreceptors 10a, 10b, 10c, and 10d.

Accordingly, when the address position is attempted to be detected using the difference signal and the threshold values Lth and Rth, the difference signal does not exceed the level of the threshold value Lth as shown by L1 and R1 in FIG. 13. Therefore, only one of the address position signals can be detected. When only one of the address position signals can be detected, switching between tracking polarities cannot be performed at the boundary between the land and the groove, and thereby a stable tracking servo cannot be performed. When the setting value of the threshold value is changed so as to be shifted closer to the center value in order to avoid the state where only one of the address position signals can be detected, the detection becomes possible. However, when the setting value is shifted too closer to the center value, the fluctuation amount of the difference signal which is generated in the data recording portion exceeds the threshold value when there is a vibration at the tracking, and a data signal is erroneously detected as an address position signal in the data recording portion. Therefore, switching between tracking polarities is performed except at the boundary between the land and the groove, and thereby the tracking servo cannot be stably performed.

As described above, there is a problem that a prior art address signal position detection apparatus cannot stably detect an address position when a DC symmetry is imperfect.

SUMMARY OF THE INVENTION

The present invention is made to solve the above-described problems in the prior art and its object is to provide an address signal position detection apparatus which can perform stable address signal position detection even when the DC symmetry is imperfect, and an optical disk playback apparatus including the same as well as an address signal position detection method.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

In order to solve the above-described problems of the prior art, according to a 1st aspect of the present invention, there is provided an address signal position detection apparatus which detects a position of an address signal which is preformatted on an optical disk on the basis of output signals from photoreceptors of a pickup, and comprises: a phase difference detection circuit for receiving the respective signal outputs from the photoreceptors of the pickup and detecting a phase difference between the respective signals; and a phase difference signal processing unit for generating an address signal position using the phase difference signal detected by the phase difference detection circuit.

According to a 2nd aspect of the present invention, in the address signal position detection apparatus of the 1st aspect, the respective signal outputs are two sum signals each of which is obtained by adding signal outputs from a pair of photoreceptors disposed diagonally, each of the pair being formed from among the four photoreceptors of the pickup.

According to a 3rd aspect of the present invention, in the address signal position detection apparatus of the 1st aspect, the phase difference signal processing unit includes comparators having two threshold values for the + side and the − side with respect to the phase difference signal, respectively.

Therefore, even when a DC symmetry is imperfect between the forward part and the rearward part of the address information portion, a stable detection of the address signal position can be made, which is difficult with the address signal position detection apparatus using the conventional difference signal.

According to a 4th aspect of the present invention, there is provided the address signal position detection apparatus of the 1st aspect which further comprises a pattern detection circuit for detecting a pattern of a reproduced waveform from the respective signal outputs from the photoreceptors of the pickup and in which the phase difference detection circuit does not make a phase comparison when the pattern detected by the pattern detection circuit does not match a predetermined pattern. Therefore, the phase difference detection circuit is prevented from erroneously detecting a phase difference while an unrecorded portion of a disk in which no data is recorded on a recording track is being reproduced, and the address position signal is not erroneously detected except on the address information portion, thereby enabling a stable detection of the address signal position.

According to a 5th aspect of the present invention, in the address signal position detection apparatus of the 4th aspect, the phase difference detection circuit detects the predetermined pattern on the basis of a recording code which is used in an optical disk which is played back.

According to a 6th aspect of the present invention, there is provided the address signal position detection apparatus of the 1st aspect which further comprises an amplitude detection circuit for detecting an envelope signal of the respective output signals from the photoreceptors and in which the phase difference detection circuit does not output the phase difference signal when the value of the envelope signal is a predetermined threshold value or less. Therefore, the phase difference detection circuit is prevented from erroneously detecting a phase difference while an unrecorded portion of a disk in which no data is recorded on a recording track is being reproduced, and the address position signal is not erroneously detected except on the address information portion, thereby enabling a stable detection of the address signal position.

According to a 7th aspect of the present invention, there is provided the address signal position detection apparatus of the 1st aspect in which the optical disk is a DVD-RAM.

According to an 8th aspect of the present invention, there is provided an optical disk playback apparatus which comprises: a spindle motor for rotating the optical disk; an optical pickup for reading a reproduced signal from the optical disk; a reproduced signal processing unit for processing the reproduced signal which is read by the optical pickup; a demodulation unit for demodulating the signal processed by the reproduced signal processing unit and subjecting the demodulated signal to error-correction; a servo error detection circuit for generating an error signal for servo control on the basis of the output signal from the optical pickup; a servo control circuit for controlling the spindle motor and the optical pickup on the basis of the error signal for servo control; an address signal position detection apparatus including a phase difference detection circuit for receiving the respective signal outputs from the photoreceptors of the pickup and detecting a phase difference between the respective signals, and a phase difference signal processing unit for generating an address signal position using the phase difference signal detected by the phase difference detection circuit, and processing the output signals from the optical pickup, and a system controller for externally communicating data and controlling the respective functional blocks. Therefore, even when a DC symmetry is imperfect between the forward part and the rearward part of the address information portion, a stable detection of the address signal position can be made, which is difficult with the address signal position detection apparatus using the conventional difference signal.

According to a 9th aspect of the present invention, there is provided an address signal position detection method for detecting a position of an address signal which is preformatted on an optical disk on the basis of output signals from photoreceptors of a pickup, which comprises: a phase difference detection step of receiving the respective signal outputs from the photoreceptors of the pickup, and making a phase comparison between the respective signals, to output a phase difference signal; and a phase difference signal processing step of generating an address signal position using the phase difference signal detected in the phase difference detection step. Therefore, even when a DC symmetry is imperfect between the forward part and the rearward part of the address information portion, a stable detection of the address signal position can be made, which is difficult with the address signal position detection apparatus using the conventional difference signal.

According to a 10th aspect of the present invention, in the address signal position detection method of the 9th aspect, the optical disk is a DVD-RAM.

BRIEF DESCRIPTION OF THE DRAWINGS

FIG. 2(*b*) is a diagram illustrating the intensity distribution patterns (far-field pattern) of an amount of light reflected on the photoreceptors when the light spot passes on the left side of the center of the information pit.

FIG. 2(*c*) is a diagram illustrating signals obtained from the photoreceptors when the light spot passes on the left side of the center of the information pit.

FIG. 7(a) is a block diagram illustrating an address signal position detection apparatus according to a second embodiment of the present invention.

FIG. 7(b) is a block diagram illustrating an example of a configuration of a pattern detection circuit and invalid pulse cancel unit shown in FIG. 7(a).

DETAILED DESCRIPTION OF THE PREFERRED EMBODIMENTS

Hereinafter, address signal position detection apparatuses, optical disk playback apparatuses and address signal position detection methods according to embodiments of the present invention will be described in detail with referent to the drawings.

Embodiment 1

Hereinafter, an address signal position detection apparatus and address signal position detection method according to a first embodiment of the present invention will be described.

Figure 1:
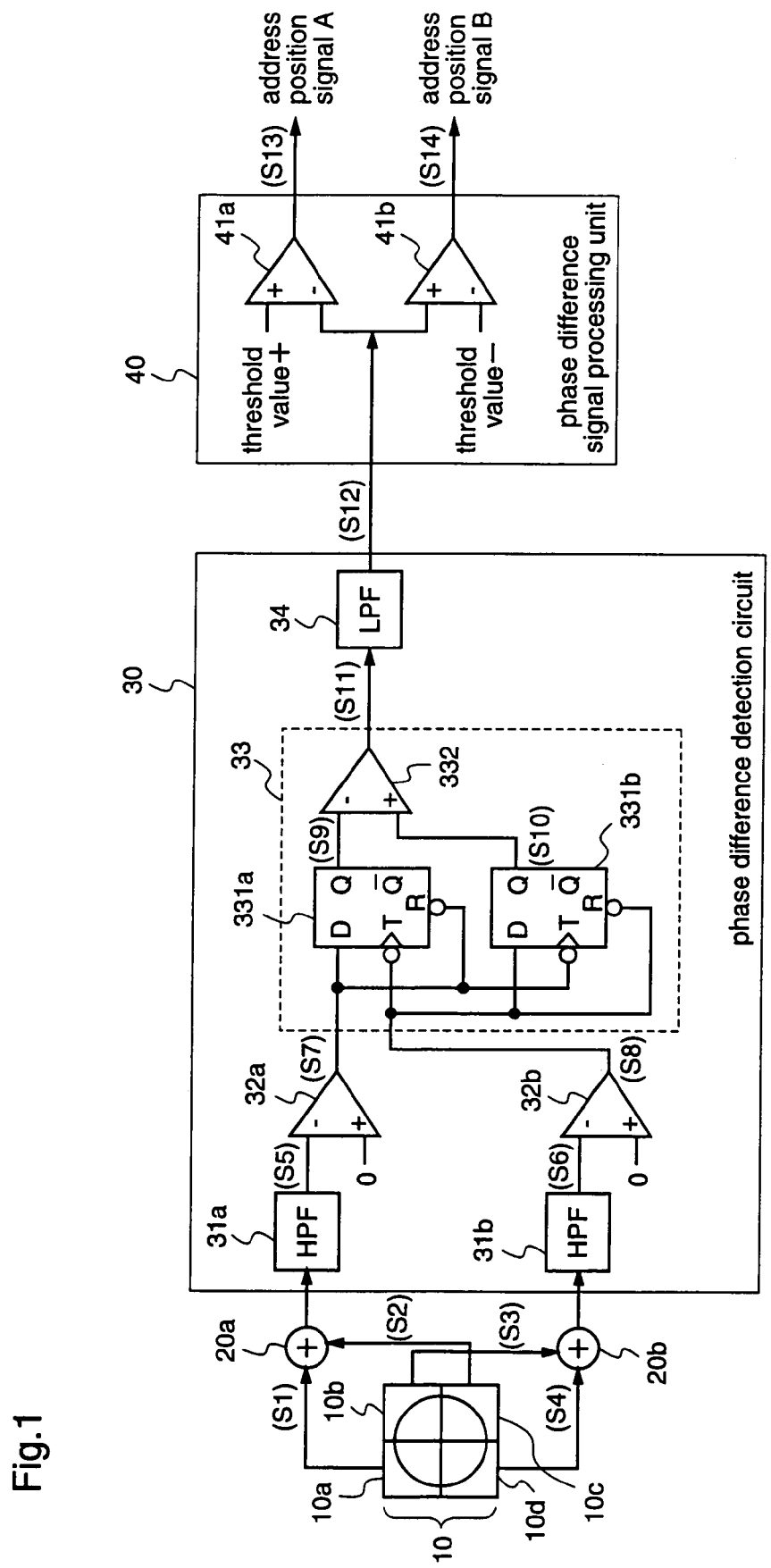
FIG. 1 is a block diagram illustrating a construction of an address signal position detection apparatus according to a first embodiment of the present invention.

FIG. 1 is a block diagram illustrating a construction of the address signal position detection apparatus according to the first embodiment of the present invention.

As shown in FIG. 1, the address signal position detection apparatus according to the first embodiment of the present invention comprises: a photodetector 10 which is mounted on a pickup and receives a reflected light of a light spot, signal generators or a first and second adders 20a and 20b which generate, from the output signals of the photodetector 10, two signal sequences whose phases change from each other according to the tracking error of the light spot, a phase difference detection circuit 30 for detecting a phase difference on the basis of the two signal sequences, and a phase difference signal processing unit 40 which generates an address signal position using the phase difference signal detected by the phase difference detection circuit 30.

The phase difference detection circuit 30 comprises a first and second high pass filters (HPFs) 31a and 31b for eliminating frequencies lower than a predetermined cut off frequency, a first and second comparators 32a and 32b for binarizing output signals from the first and second HPFs 31a and 31b at the zero cross, a phase comparator 33 for detecting a phase difference between the two binarized signals which are binarized by the first and second comparators 32a and 32b, and a low pass filter (LPF) 34 for smoothing the output pulse signal from the phase comparator 33 and outputting the smoothed signal as a phase difference signal.

The phase difference signal processing unit 40 comprises a third and fourth comparators 41a and 41b which have two threshold values for the + side and the − side with respect to the phase difference signal detected by the phase difference detection circuit 30, respectively.

The phase difference detection circuit 30 executes the phase difference detection step of receiving the respective signal outputs from the photoreceptors of the pickup and making a phase comparison between the respective signals to output a phase difference signal, and the phase difference signal processing unit 40 executes the phase difference signal processing step of generating an address signal position using the phase difference signal detected in the phase difference detection step.

Here, the photodetector 10 comprises the photoreceptors 10a, 10b, 10c, and 10d which are divided into four so as to form the cross-in-square shape.

Initially, the photodetector 10 receives a reflected light of a light spot obtained by applying a light onto a track of an optical disk medium and outputs a signal corresponding to the amount of light received.

Figure 2A:
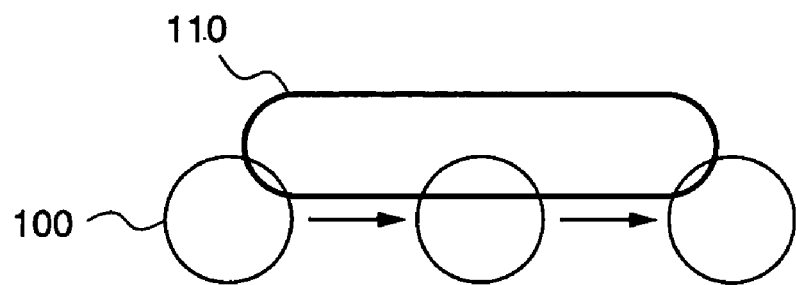
FIG. 2(*a*) is a diagram illustrating a positional relationship between a light spot and an information pit when the light spot passes on the left side of the center of the information pit.
Figure 2B:
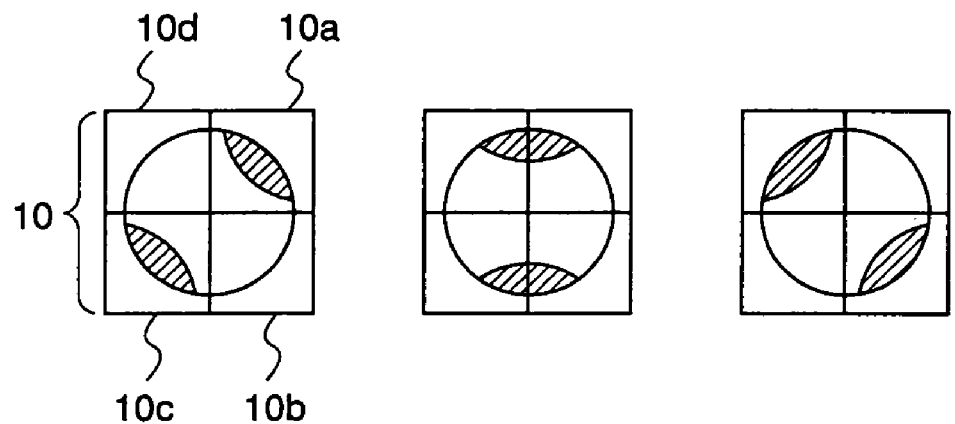
Figure 2C:
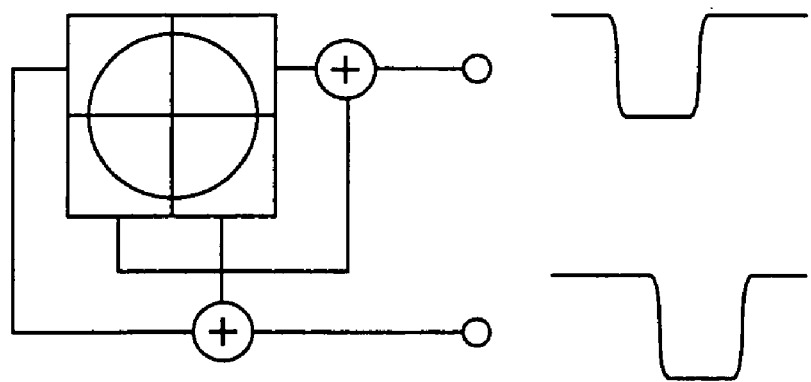
Figure 3A:
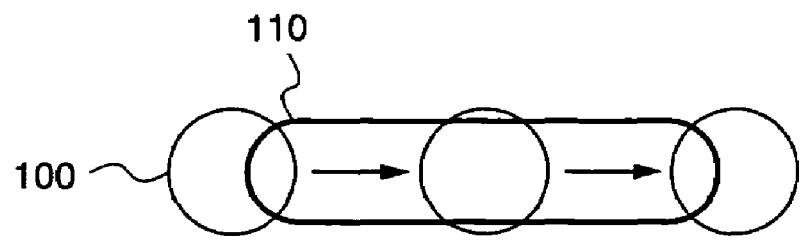
FIG. 3(a) is a diagram illustrating a positional relationship between a light spot and an information pit when the light spot passes through the center of the information pit.
Figure 3B:
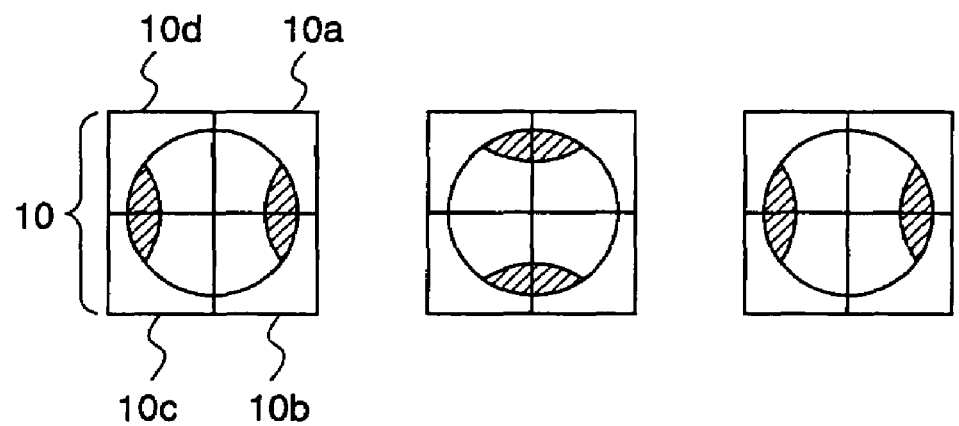
FIG. 3(b) is a diagram illustrating the intensity distribution patterns (far-field pattern) of an amount of light reflected on the photoreceptors when the light spot passes through the center of the information pit.
Figure 3C:
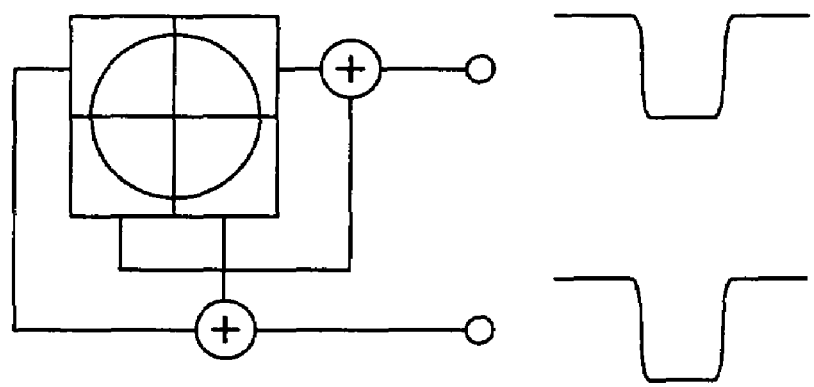
FIG. 3(c) is a diagram illustrating signals obtained from the photoreceptors when the light spot passes through the center of the information pit.
Figure 4A:
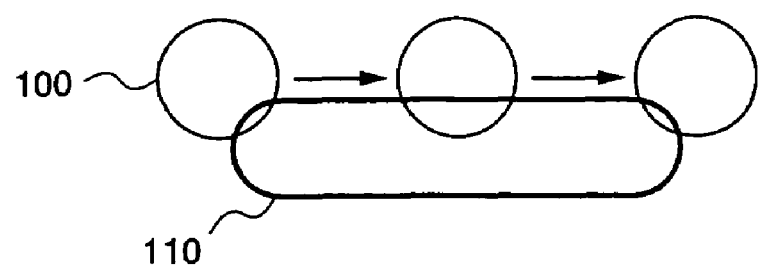
FIG. 4(a) is a diagram illustrating a positional relationship between a light spot and an information pit when the light spot passes on the right side of the center of the information pit.
Figure 4B:
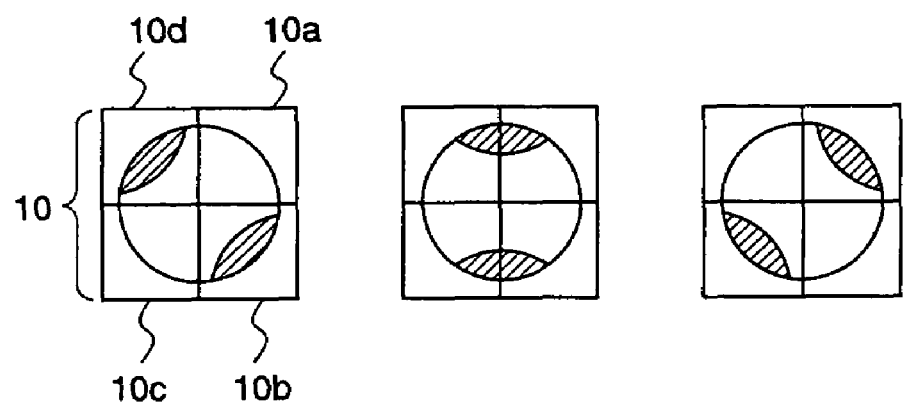
FIG. 4(b) is a diagram illustrating the intensity distribution patterns (far-field pattern) of an amount of light reflected on the photoreceptors when the light spot passes on the right side of the center of the information pit.
Figure 4C:
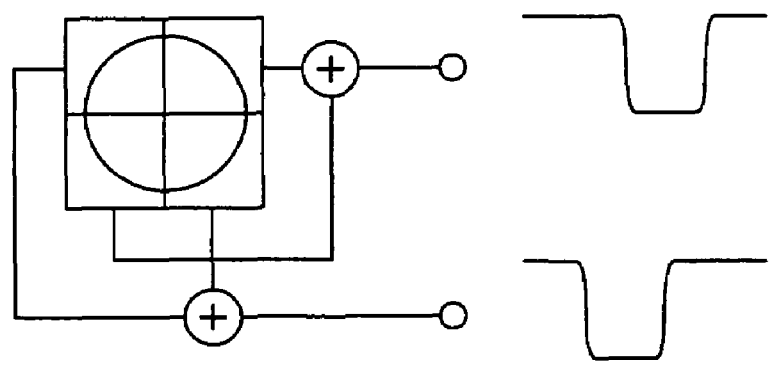
FIG. 4(c) is a diagram illustrating signals obtained from the photoreceptors when the light spot passes on the right side of the center of the information pit.

FIGS. 2 to 4 show examples of change in intensity distribution pattern (far-field pattern) of the amount of light reflected when the light spot passes on the optical disk medium. FIGS. 2(a), 3(a) and 4(a) show positional relationships between light spots 100 and information pits 110, respectively, FIGS. 2(b), 3(b) and 4(b) show intensity distribution patterns (far-field pattern) of the amounts of lights reflected on the photoreceptors, respectively, and FIGS. 2(c), 3(c) and 4(c) show signals obtained from the photoreceptors, respectively.

When the light spot 100 passes on the information pits 110, the far-field pattern of the amount of light reflected changes with time. As shown in FIG. 3, when the light spot 100 passes through the center of the information pit 110, that is, the center of the track, the pattern changes bilaterally symmetrically as shown by hatch patterns in FIG. 3. As shown in FIG. 2, when the light spot 100 passes on the left side of the center of the information pit 110, the pattern changes so as to turn clockwise. On the other hand, as shown in FIG. 4, when the light spot 100 passes on the right side of the center of the information pit 110, the pattern changes so as to turn counterclockwise.

The photodetector 10 comprises the photoreceptors 10a, 10b, 10c, and 10d which are divided into four so as to form the cross-in-square shape as shown in figures, and the photoreceptors output signals corresponding to the amounts of lights incident thereon, respectively. Thereafter, the first adder 20a obtains the sum of the outputs from the photoreceptors 10a and 10c of the photodetector 10 and the second adder 20b obtains the sum of the outputs from the photoreceptors 10b and 10d of the photodetector 10 so as to add the signals obtained from the photoreceptors disposed diagonally, respectively, and the phases of these signals are compared, thereby enabling the positional difference between the light spot and the track to be detected on the basis of the amount of phase advance or the amount of phase delay, as shown in FIGS. 2(c), 3(c) and 4(c).

Figure 5:
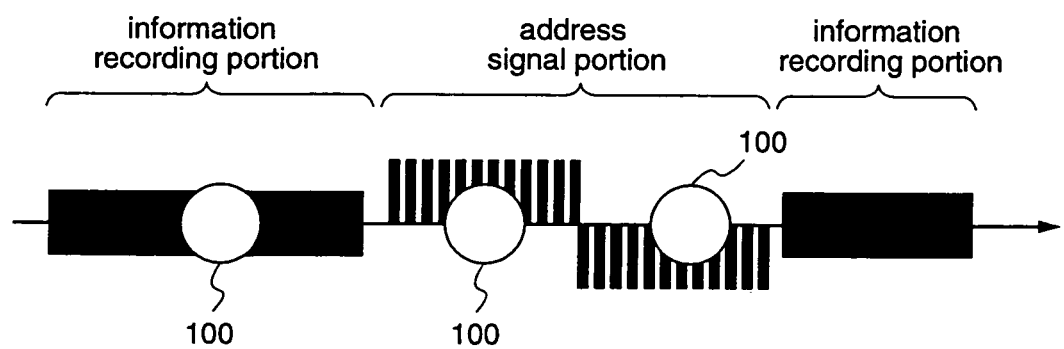
FIG. 5 is a diagram illustrating a relationship between a light spot and recording pits on an optical disk medium using the land/groove recording method.

Next, a relationship between the light spot and the recording pit on the optical disk medium using the land/groove recording method will be described. FIG. 5 shows an example of the relationship between the light spot and the recording pit on the optical disk medium using the land/groove recording method. The light spot 100 advancing from the left side to the right side in FIG. 5 passes through the center of the data recording portion (information recording portion). On the other hand, the light spot 100 passes on the right side of the center of the address information portion in the first half part of the address information portion (address signal portion) and the light spot 100 passes on the left side of the center of the address information portion in the latter half part of the address information portion. These states correspond to the positional relationships between the light spots and the information pits described as above with reference to FIGS. 2 to 4, respectively, and the state of the data recording portion corresponds to that shown in FIG. 3, the state of the first half part of the address information portion corresponds to that shown in FIG. 2, and the state of the latter half part of the address information portion corresponds to that shown in FIG. 4. Therefore, the phase difference between the output signals from the first adder 20a and second adder 20b is not generated in the data recording portion, while the phase differences between the output signals from the first adder 20a and second adder 20b are generated in the address information portion, and further the phase differences having different polarities between the first half part and the latter half part of the address information portion are generated. The use of the information of the phase differences each having a different polarity from each other enables the positional information of the first half part and the latter half part of the address information portion to be detected.

Figure 6:
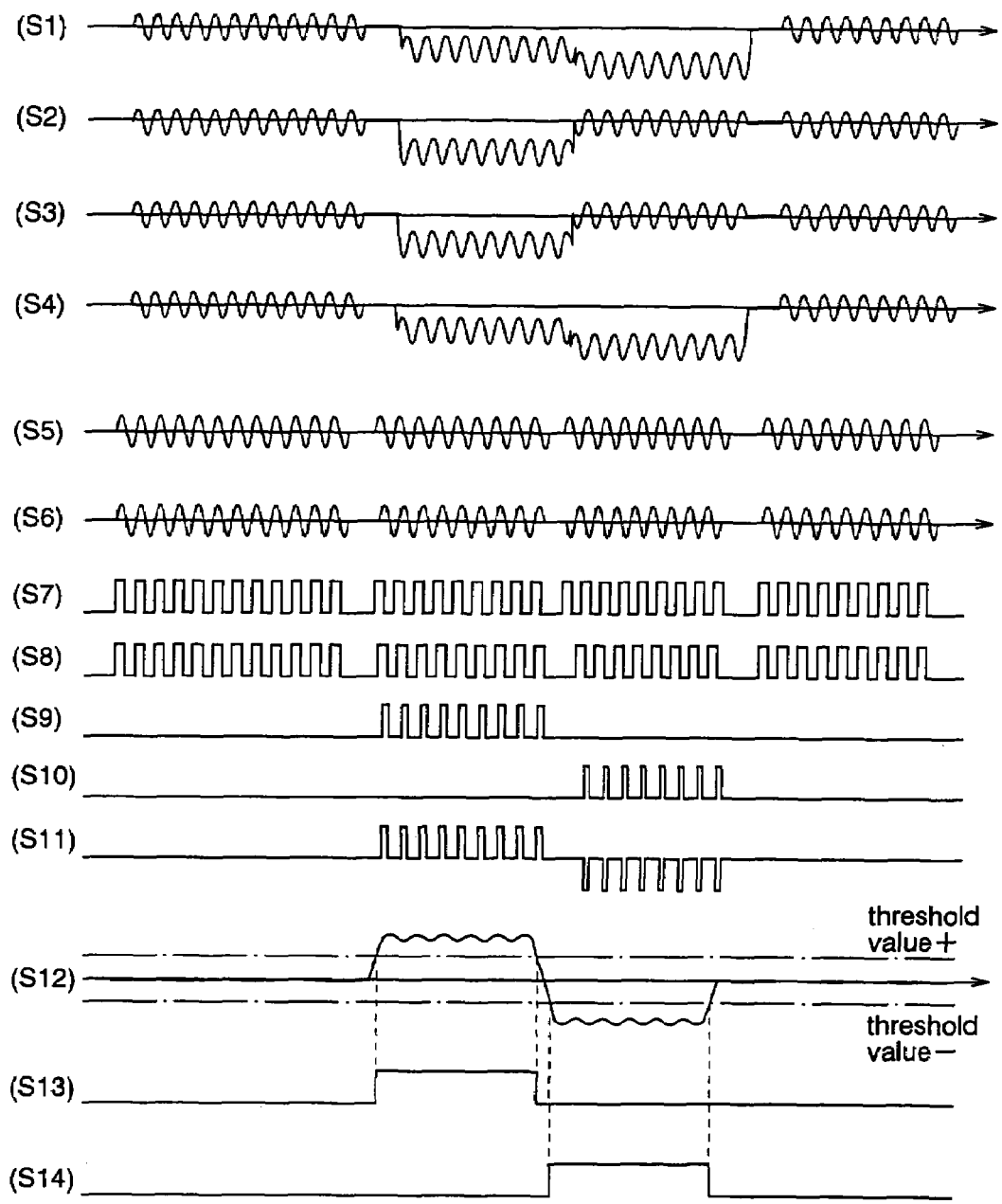
FIG. 6 is a diagram for explaining an operation of the address signal position detection apparatus according to the first embodiment of the present invention.
Figure 13:
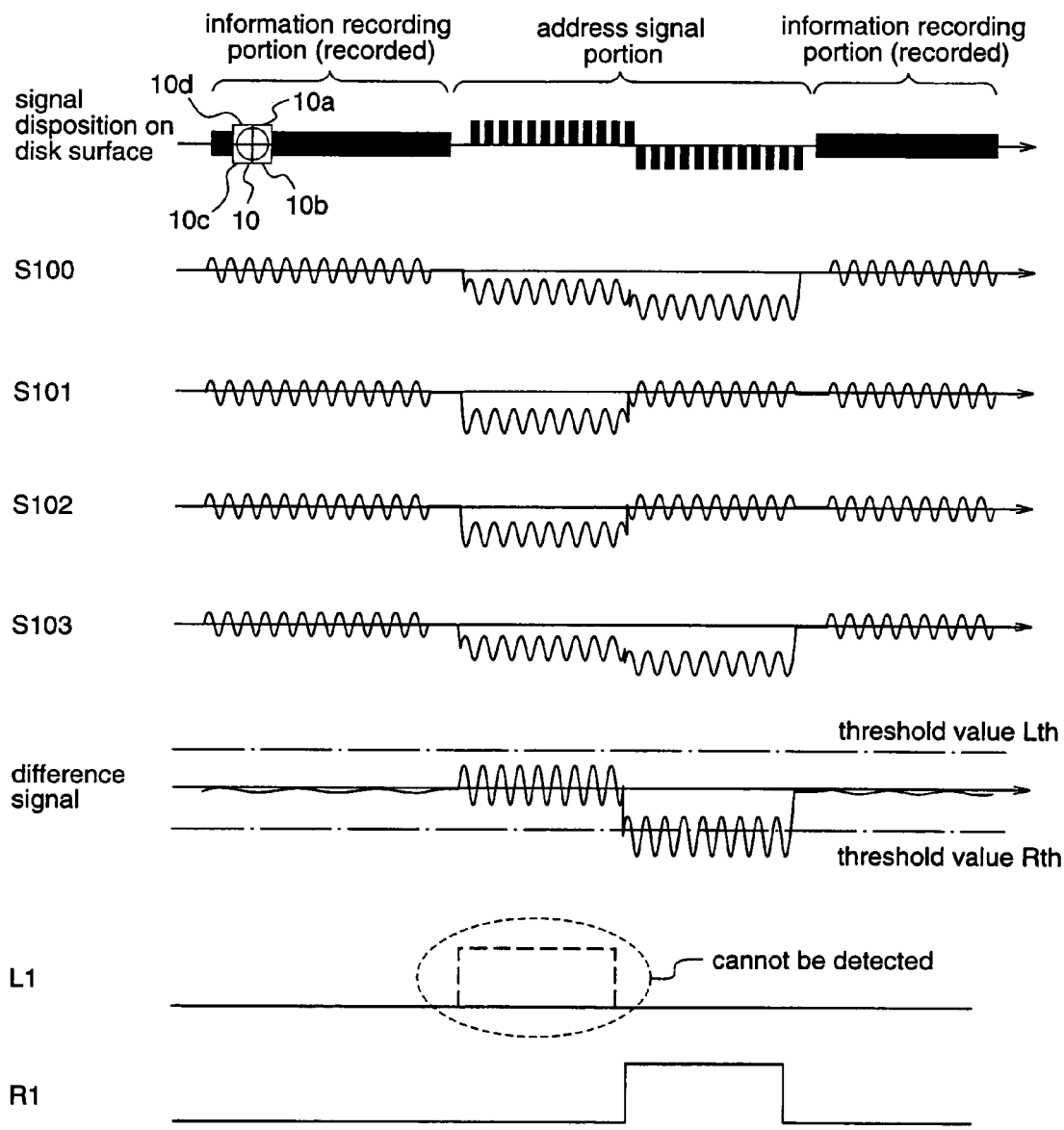
FIG. 13 is a diagram illustrating an address position detection signal detected by the prior art address signal position detection apparatus in a case where a DC symmetry is imperfect.

Next, operations of the phase difference detection circuit 30 and the phase difference signal processing unit 40 will be described in detail with reference to FIG. 6. FIG. 6 is a waveform diagram illustrating waveforms of the signals shown as (s1) to (s4) in FIG. 1. The (s1) to (s4) in FIG. 6 show the respective output signals from the photoreceptors 10a, 10b, 10c, and 10d of the photodetector 10 in the case of the DC symmetry being imperfect between the forward part and the rearward part of the address information portion, which is a problem in the conventional construction described with reference to FIG. 13. The conventional construction makes it difficult to detect an address position because the DC symmetry is imperfect between the forward part and the rearward part of the address information portion in the difference signals obtained from the respective photoreceptors of the photodetector 10. On the other hand, in the method for detecting the address position using the phase difference signal according to the first embodiment, initially the first adder 20a obtains the sum of the outputs from the photoreceptors 10a and 10c of the photodetector 10, and the second adder 20b obtains the sum of the outputs from the photoreceptors 10b and 10d of the photodetector 10, and thereafter the first and second HPFs 31a and 31b in the phase difference detection circuit 30 eliminate signals of frequencies lower than a predetermined cut off frequency, thereby obtaining the waveforms shown in FIG. 6(s5) and FIG. 6(s6).

The output signals from the first and second HPFs 31a and 31b are binarized by the first and second comparators 32a and 32b as shown in FIG. 6(s7) and FIG. 6(s8). The phase difference between these binarized signals at the rising or the falling is detected by the phase comparator 33.

In the circuit configuration of the phase comparator 33 shown in FIG. 1, the phase difference at the falling is detected with using D flip-flops (D-FF) 331a and 331b. Each of the D-FFs 331a and 331b includes an input terminal D, a clock input terminal T, a reset input terminal R, and output terminals Q and Q–, and when the input of the reset terminal R is set to logical "L" level, the output of the output terminal Q is unconditionally set to "L" level, and when the input of the reset terminal R is set to logical "H" level, a signal of the logical level which is equal to the level given to the input terminal D when the level of the clock terminal T falls from "H" to "L" is outputted from the terminal Q. That is, the D-FFs 331a and 331b detect the phase differences between the binarized signals to obtain the time difference pulse A and time difference pulse B shown in FIG. 6(s9) and FIG. 6(s10), respectively. The time difference pulse A is outputted from the output terminal Q of the D-FF 331a while the time difference pulse B is outputted from the output terminal Q of the D-FF 331b. The time difference pulse A and time difference pulse B are converted into a pulse width modulated signal shown in FIG. 6(s11) by the difference detector 332 and further the pulse width modulated signal is filtered through the LPF 34, thereby obtaining a phase difference signal shown in FIG. 6(s12).

The phase difference signal processing unit 40 is provided with a third and fourth comparators 41a and 41b having two threshold values for the + side and the – side with respect to the phase difference signal, respectively, in order to detect the information of the address signal position, which emerges according to the change in polarity of the phase difference signal, and generates an address position signal A and an address position signal B. When the phase difference signal has a value equal to or larger than the threshold value for the + side, the address position signal A is Hi, while when the phase difference signal has a value equal to or smaller than the threshold value for the + side, the address position signal A is Lo. On the other hand, when the phase difference signal has a value equal to or smaller than the threshold value for the − side, the address position signal B is Hi, while the phase difference signal has a value equal to or larger than the threshold value for the − side, the address position signal B is Lo.

FIG. 6(s13) and FIG. 6(s14) show the address position signal A and address position signal B which are detected, respectively.

The threshold values for the + side and the − side for use in the comparators are set to, for example, the levels of the phase difference signals for when an amount of tracking deviation is ¼ track pitch. This is because it is taken into consideration that the address position signals which are deviated by half the track pitch from the center of the recording track into the left and the right are detected on the basis of the phase difference signal detected in the address signal portion.

As described above, the address signal position detection apparatus according to the first embodiment of the present invention comprises the phase difference detection circuit 30 which receives the respective signal outputs from the photoreceptors of the pickup, and makes a phase comparison between the signals to output a phase difference signal, and the phase difference signal processing unit 40 which generates an address signal position using the phase difference signal detected by the phase difference detection circuit, wherein the phase difference signal processing unit comprises the comparators 32a and 32b having two threshold values for the + side and the − side with respect to the phase difference signal, respectively. Therefore, even when the DC symmetry is imperfect between the forward part and the rearward part of the address information portion, a stable detection of the address signal position becomes possible, which is difficult with the address signal position detection apparatus using a conventional difference signal.

Embodiment 2

Hereinafter, an address signal position detection apparatus according to a second embodiment of the present invention will be described.

FIG. 7(a) is a block diagram illustrating the whole construction of the address signal position detection apparatus according to the second embodiment of the present invention. Further, FIG. 7(b) is a block diagram illustrating an example of an internal construction of a pattern detection circuit and invalid pulse cancel unit.

As shown in FIG. 7, the address signal position detection apparatus according to the second embodiment of the present invention comprises a photodetector 10, a first and second adders 20a and 20b, a phase difference detection circuit 37, a pattern detection circuit 50, and a phase difference signal processing unit 40. Then, the respective constituents other than the phase difference detection circuit 37 and the pattern detection circuit 50 in the address signal position detection apparatus according to the second embodiment are identical to those of the first embodiment described as above with reference to FIG. 1 and are denoted by the same reference numerals, and the description is omitted here.

The phase difference detection circuit 37 comprises a first and second HPFs 31a and 31b, a first and second comparators 32a and 32b, a phase comparator 33, an invalid pulse cancel unit 35, and an LPF 34. Then, the respective constituents other than the invalid pulse cancel unit 35, which constitute the phase difference detection circuit 37, are identical to those of the first embodiment described as above with reference to FIG. 1 and are denoted by the same reference numerals, and the description is omitted here.

The pattern detection circuit 50 detects a pattern of the binarized signal used for detecting a phase difference, and detects pulse widths of the binarized signals which are outputted from the first and second comparators 32a and 32b, thereby detecting the patterns.

When the pulse widths of the binarized signals from the first and second comparators 32a and 32b, which are detected by the pattern detection circuit 50, have a value equal to or smaller than a predetermined value or a value equal to or larger than a predetermined value, these binarized signals are handled as invalid pulses and the invalid pulse cancel unit 35 cancels the result of the phase comparison obtained on the basis of the binarized signals among the results of the phase comparisons detected by the phase comparator 33 and does not use the result.

Next, operations of the pattern detection circuit 50 and the phase difference detection circuit 37 according to the second embodiment will be described.

Figure 8A:
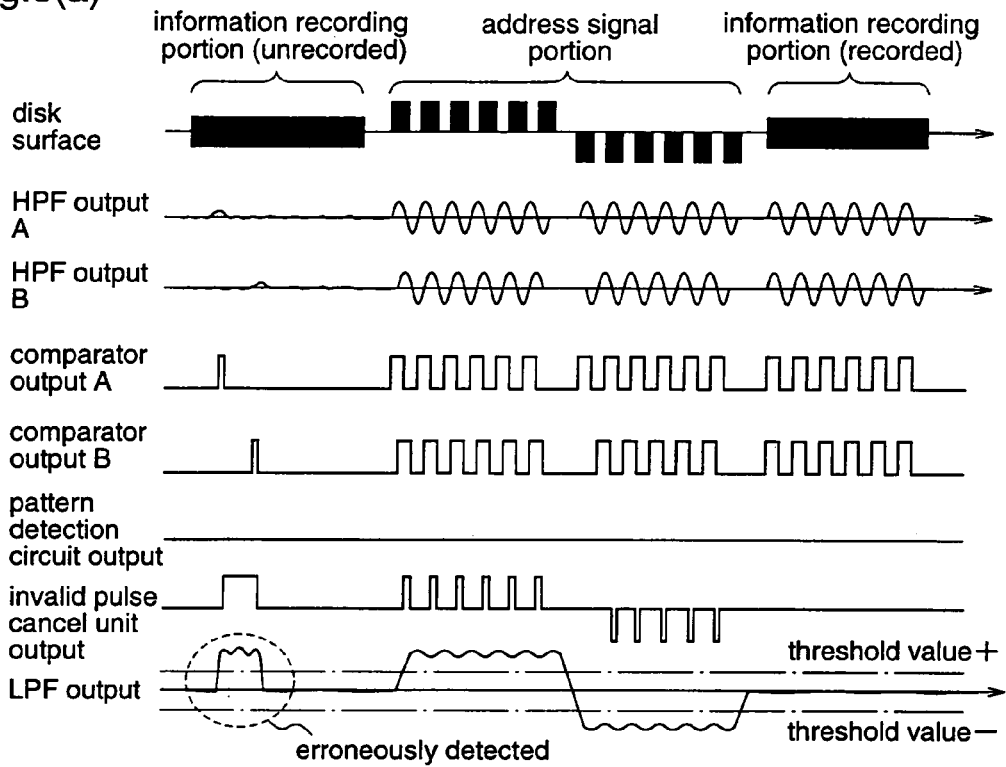
FIG. 8(a) is a diagram for explaining a case where it is assumed that the invalid pulse cancel unit in the address signal position detection apparatus according to the second embodiment of the present invention does not cancel the phase comparison.
Figure 8B:
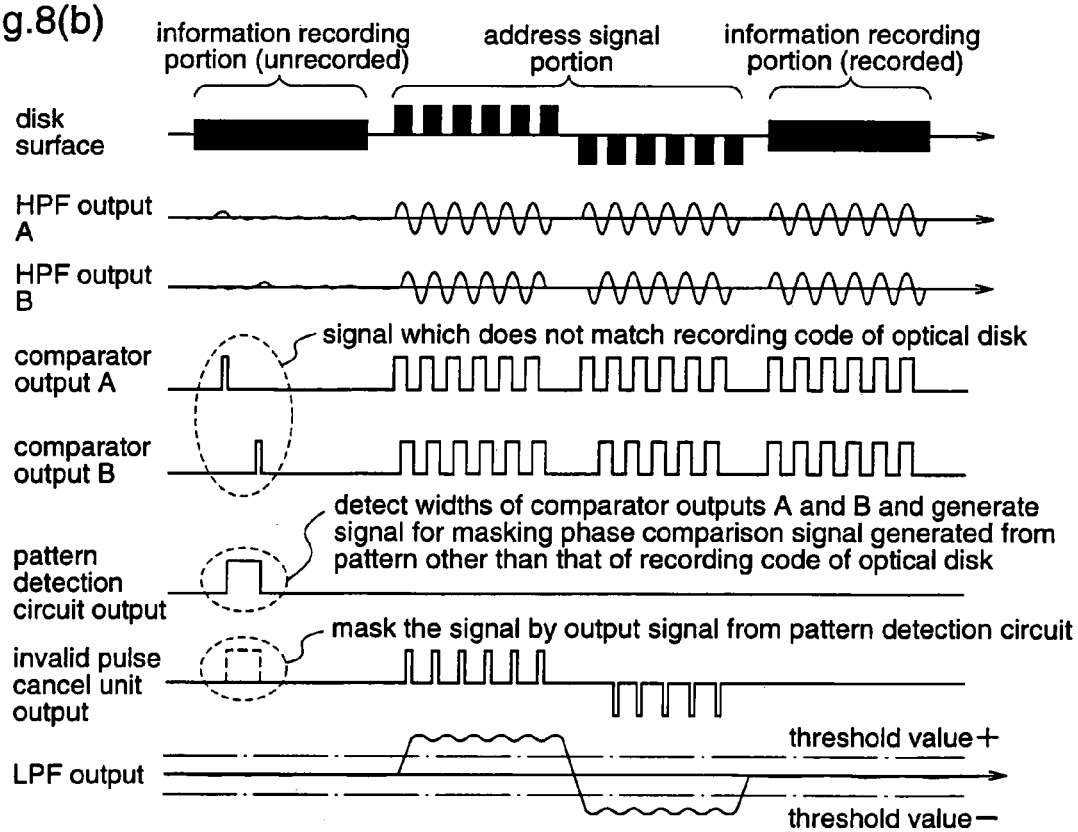
FIG. 8(b) is a diagram for explaining a case where the invalid pulse cancel unit in the address signal position detection apparatus according to the second embodiment of the present invention cancels the phase comparison.

FIG. 8 is a diagram for explaining an operation of the invalid pulse cancel unit 35 in the address signal position detection apparatus according to the second embodiment of the present invention, FIG. 8(a) is a diagram illustrating a case where the invalid pulse cancel unit 35 does not cancel the phase comparison, and FIG. 8(b) is a diagram illustrating a case where the invalid pulse cancel unit 35 cancels the phase comparison.

In the optical disk medium using the land/groove recording method, while the information pits are previously formed on the address information portion by preformatting the pits, data are sometimes unrecorded and no recording pit is formed in the data recording portion. In a case where no recording pit is formed in the data recording portion, the output waveforms from the first and second HPFs 31a and 31b include no waveforms of the recording pits, as shown in FIG. 8(a). However, a pulse which is not associated with a recording pit is generated in the binarized signals outputted from the first and second comparators 32a and 32b due to the influence of noises and the like, thereby generating an incorrect phase comparison signal. Therefore, in the phase difference signal generated by finally limiting the band in the LPF 34, the level thereof changes due to the influence of the erroneous detection made by the phase comparator 33, and thereby the phase difference signal processing unit 40 erroneously detects an address signal position.

Therefore, in the address signal position detection apparatus according to the second embodiment, the pattern detection circuit 50 detects pulse widths of the binarized signals from the first and second comparators 32a and 32b so as to cancel the result of the phase comparison based on the binarized signals having patterns which do not match the patterns of the recording pits among the results of the phase comparisons based on the binarized signals from the first and second comparators 32a and 32b, and when the pulse widths of the binarized signals, which are detected by the pattern detection circuit 50, have a value equal to or smaller than a predetermined value or a value equal to or larger than a predetermined value, the binarized signals are handled as invalid pulses and the invalid pulse cancel unit 35 in the phase difference detection circuit 37 does not output the result of the phase comparison obtained on the basis of the binarized signals among the results of the phase comparisons detected by the phase comparator 33.

However, in a case where a setting value used for determining an invalid pulse is not appropriately set in the pattern detection circuit 50, an incorrect output is outputted from the LPF 34 as shown in FIG. 8(a).

On the other hand, as shown in FIG. 8(b), in a case where a setting value is appropriately set so as to make an appropriate determination, when the phase comparison based on the invalid pulse is cancelled by the invalid pulse cancel unit 35, the result of the phase comparison based on the binarized signals generated due to the influence of the noise and the like is not outputted, and thereby the change in level due to the influence of the erroneous detection made by the phase comparator 33 can be suppressed for the phase difference signal generated by limiting the band in the LPF 34, thereby preventing the phase difference signal processing unit 40 from erroneously detecting an address signal position.

Next, a specific example of a setting value used for determining the invalid pulse in the invalid pulse cancel unit 35 will be described.

For example, when an 8-16 modulation code used as a recording code for a DVD is employed and the channel rate is 1T, the binarized signals outputted from the first and second comparators 32a and 32b are composed of the recording patterns of 3T to 14T. Then, the pattern detection circuit 50 detects the pulse widths of the binarized signals, and judges a pulse having the detected pulse width of 3T or less or a pulse having the detected pulse width of 14T or more, as an invalid pulse, and the invalid pulse cancel unit 35 in the phase difference detection circuit 37 does not output the result of the phase comparison based on the pulse.

This can be realized by, for example, the following construction. That is, as shown in FIG. 7(b), pulse width detectors 501 and 502 detect the pulse widths of the output signals from the comparators 32a and 32b, respectively, and invalid pulse determination units 503 and 504 detect a pulse having the detected pulse width of 3T or less or a pulse having the detected pulse width of 14T or more, as an invalid pulse, and a front edge detector 505 and a rear edge detector 506 detect a front edge and a rear edge of each invalid pulse, respectively, and a first front edge detector 507 detects a front edge emerging first and a last rear edge detector 508 detects a rear edge emerging last, and the mono multivibrator 509 is driven according to the detection results, thereby generating a switching signal for a selector 352. When the switching signal is L, the selector 352 selects an output signal from the phase comparator 33, and when the switching signal is H, the selector 352 selects an output signal from the center level output unit 351 which outputs a center level of an output signal from the phase comparator 33, thereby outputting the selected signal to the LPF 34. Thereby, in a case where an invalid pulse is generated in the actual recording portion on the information recording portion, the result of the phase comparison based on the invalid pulse can be cancelled.

Here, it is meant by nT (n is an integer of 1 or more) that the number of times the recorded data "0" or "1" continues is n times.

As described above, in the address signal position detection apparatus according to the second embodiment of the present invention, the pattern detection circuit 50 detects pulse widths of the binarized signals from the first and second comparators 32a and 32b, which are used for the phase comparison, and when the pulse width detected by the pattern detection circuit 50 has a value equal to or smaller than a predetermined value or a value equal to or larger than a predetermined value, the pulse having such pulse width is handled as an invalid pulse and the invalid pulse cancel unit 35 in the phase difference detection circuit. 37 does not output the result of the phase comparison based on the pulse, and thereby even when no recording pit is formed on the data recording portion in the optical disk medium using the land/groove recording method, the address signal position can be stably detected.

Embodiment 3

Hereinafter, an address signal position detection apparatus according to a third embodiment of the present invention will be described.

Figure 9A:
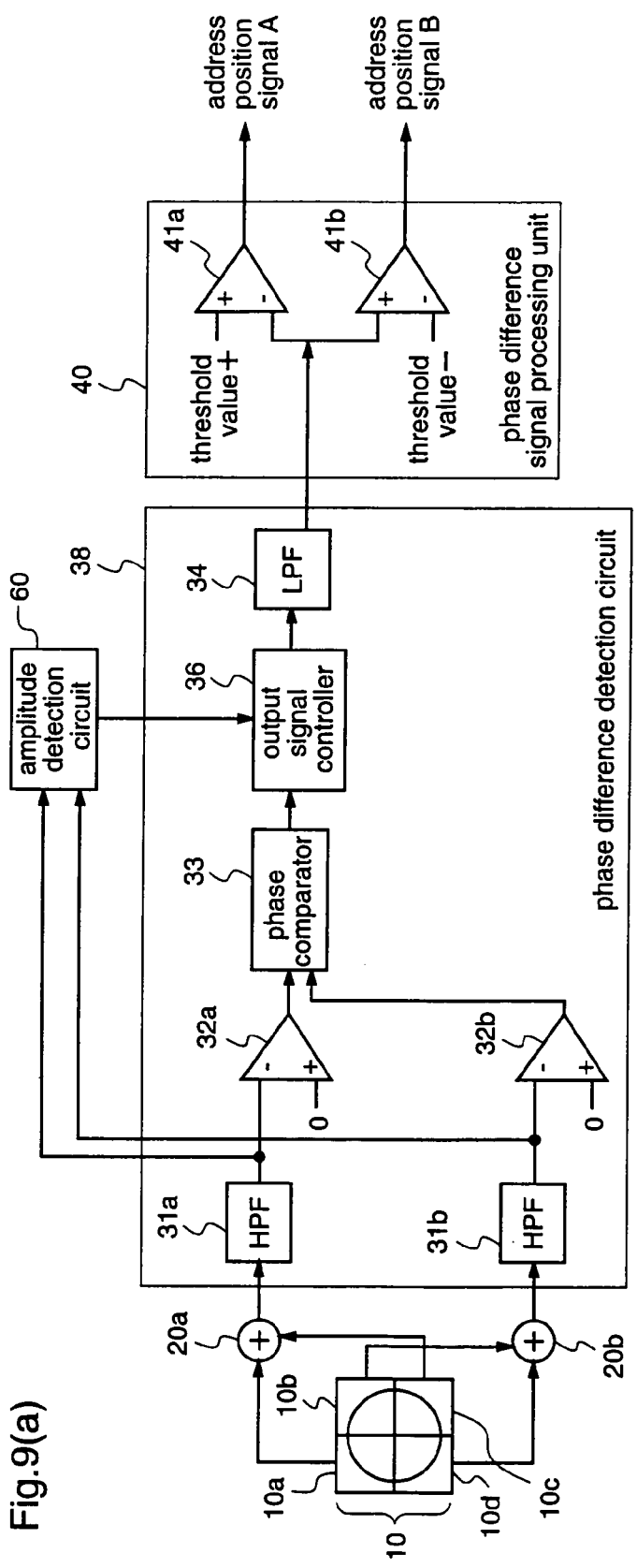
FIG. 9(a) is a block diagram illustrating an address signal position detection apparatus according to a third embodiment of the present invention.

FIG. 9(a) is a block diagram illustrating the whole construction of the address signal position detection apparatus according to the third embodiment of the present invention. Further, FIG. 9(b) is a block diagram illustrating an example of the internal configuration of the amplitude detection circuit thereof.

In FIG. 9(a), the address signal position detection apparatus according to the third embodiment comprises a photodetector 10, a first and second adders 20a and 20b, a phase difference detection circuit 38, an amplitude detection circuit 60, and a phase difference signal processing unit 40. Then, the respective constituents in the address signal position detection apparatus according to the third embodiment other than the phase difference detection circuit 38 and the amplitude detection circuit 60 are identical to those of the first embodiment described above with reference to FIG. 1 and are denoted by the same reference numerals, and the description is omitted here.

The phase difference detection circuit 38 comprises a first and second HPFs 31a and 31b, a first and second comparators 32a and 32b, a phase comparator 33, an output signal controller 36, and an LPF 34. Then, the respective constituents other than the output signal controller 36, which constitute the phase difference detection circuit 38, are identical to those of the first embodiment described above with reference to FIG. 1 and are denoted by the same reference numerals, and the description is omitted here.

Figure 9B:
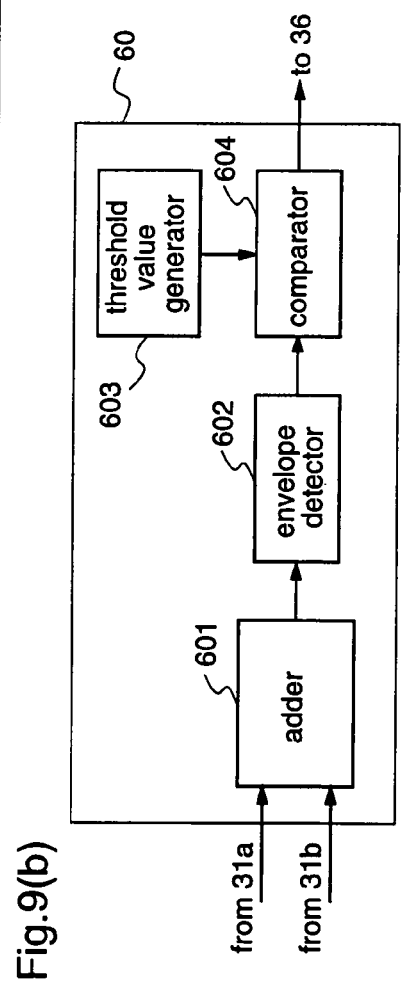
FIG. 9(b) is a block diagram illustrating an example of a configuration of an amplitude detection circuit shown in FIG. 9(a).

The amplitude detection circuit 60 can be realized by obtaining a sum signal of the respective signals outputted from the first and second HPFs 31a and 31b in an adder 601, detecting an envelope signal of the sum signal in an envelope detector 602, detecting whether or not the value of the envelope signal is a predetermined threshold value or less in a comparator 604, and generating a gate signal for notifying whether the output signal controller 36 in the phase difference detection circuit 38 is to be operated or not on the basis of the detection result to output the gate signal, and the like, as shown in FIG. 9(b). The amplitude detection circuit 60 outputs a gate signal which becomes Hi when the value of the envelope signal is a predetermined threshold value or more and outputs a gate signal which becomes Lo when the value of the envelope signal is a predetermined threshold value or less. Then, the predetermined threshold value of the amplitude detection circuit 60 can be arbitrarily set, and the predetermined value is previously set in the threshold value generator 603.

The output signal controller 36 is constructed as, for example, an attenuator, and controls whether or not the result of the phase comparison outputted from the phase comparator 33 is to be outputted according to the gate signal generated by the amplitude detection circuit 60. When the gate signal generated by the amplitude detection circuit 60 is Hi, the output signal controller 36 outputs the result of the phase comparison generated by the phase comparator 33 as it is, while when the gate signal generated by the amplitude detection circuit 60 is Lo, the output signal controller 36 does not output the result of the phase comparison generated by the phase comparator 33.

Next, an operation of the amplitude detection circuit 60 according to the third embodiment will be described.

Figure 10A:
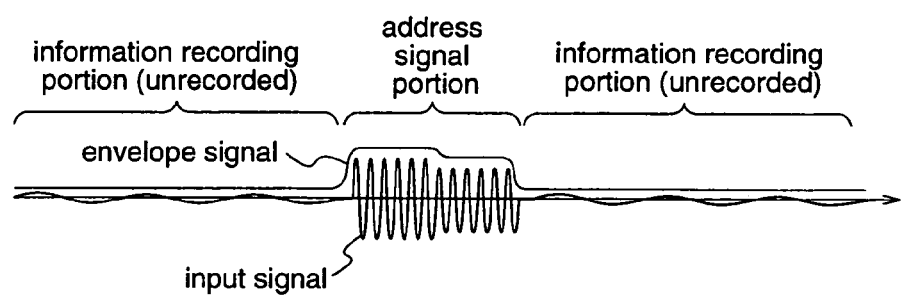
FIG. 10(a) is a diagram illustrating an envelop signal detected by the amplitude detection circuit in the address signal position detection apparatus according to the third embodiment of the present invention.
Figure 10B:
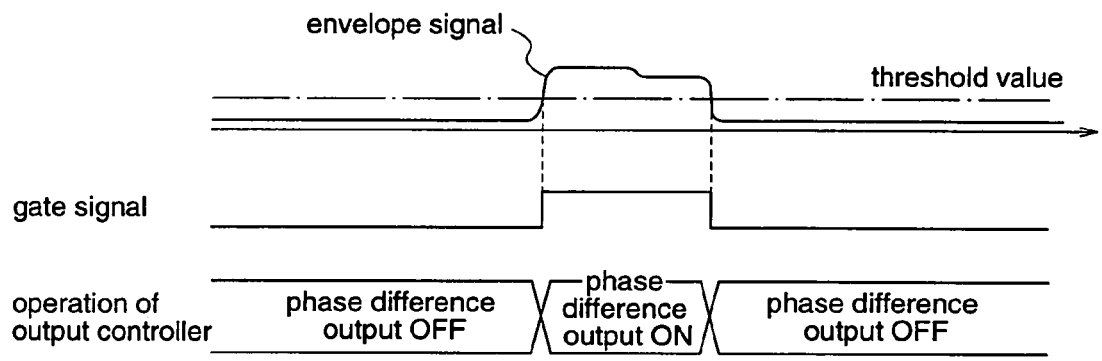
FIG. 10(b) is a diagram illustrating a gate signal outputted from the amplitude detection circuit in the address signal position detection apparatus according to the third embodiment of the present invention.
Figure 11:
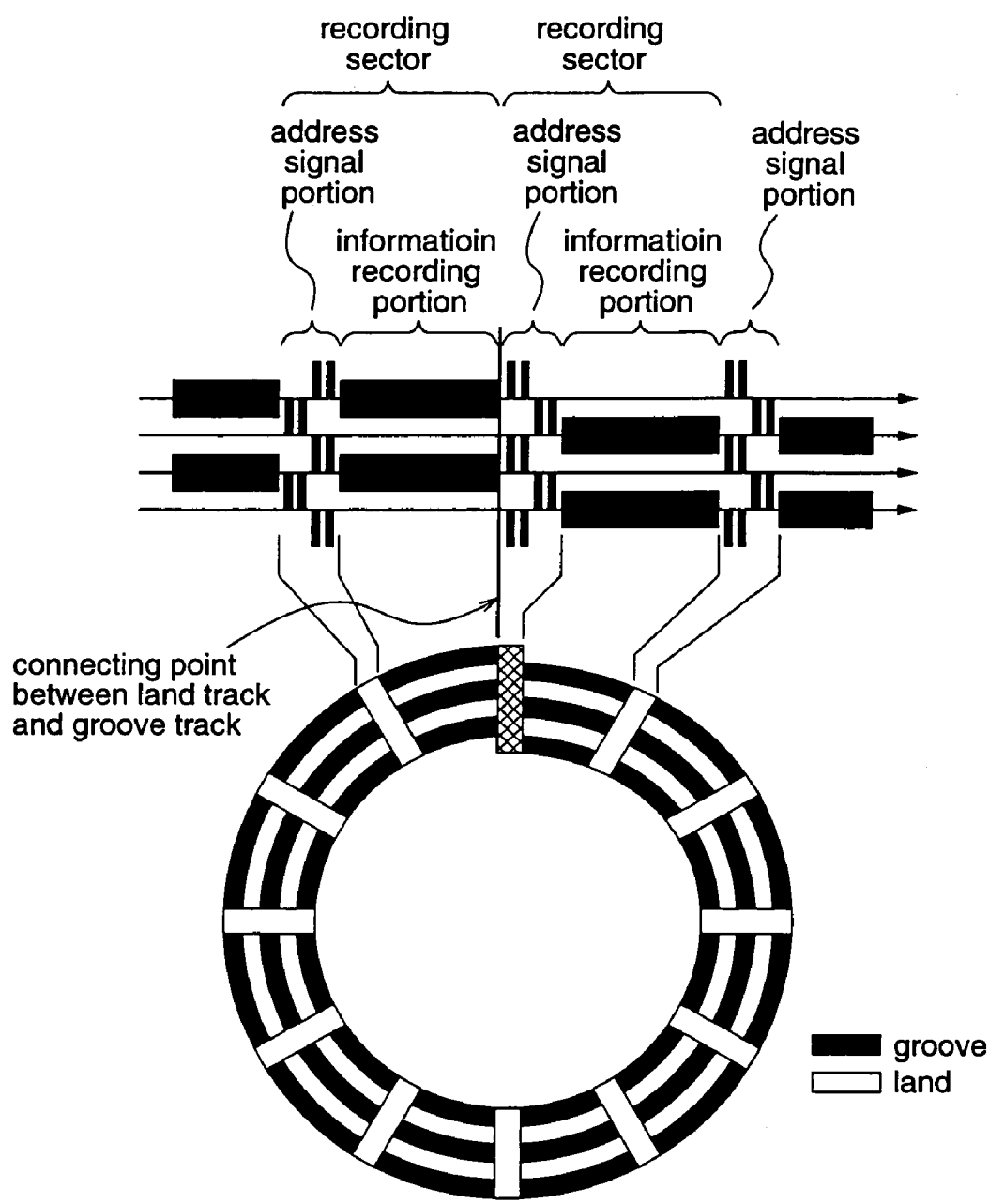
FIG. 11 is a diagram illustrating a track layout on the optical disk medium using the land/groove recording method.
Figure 12:
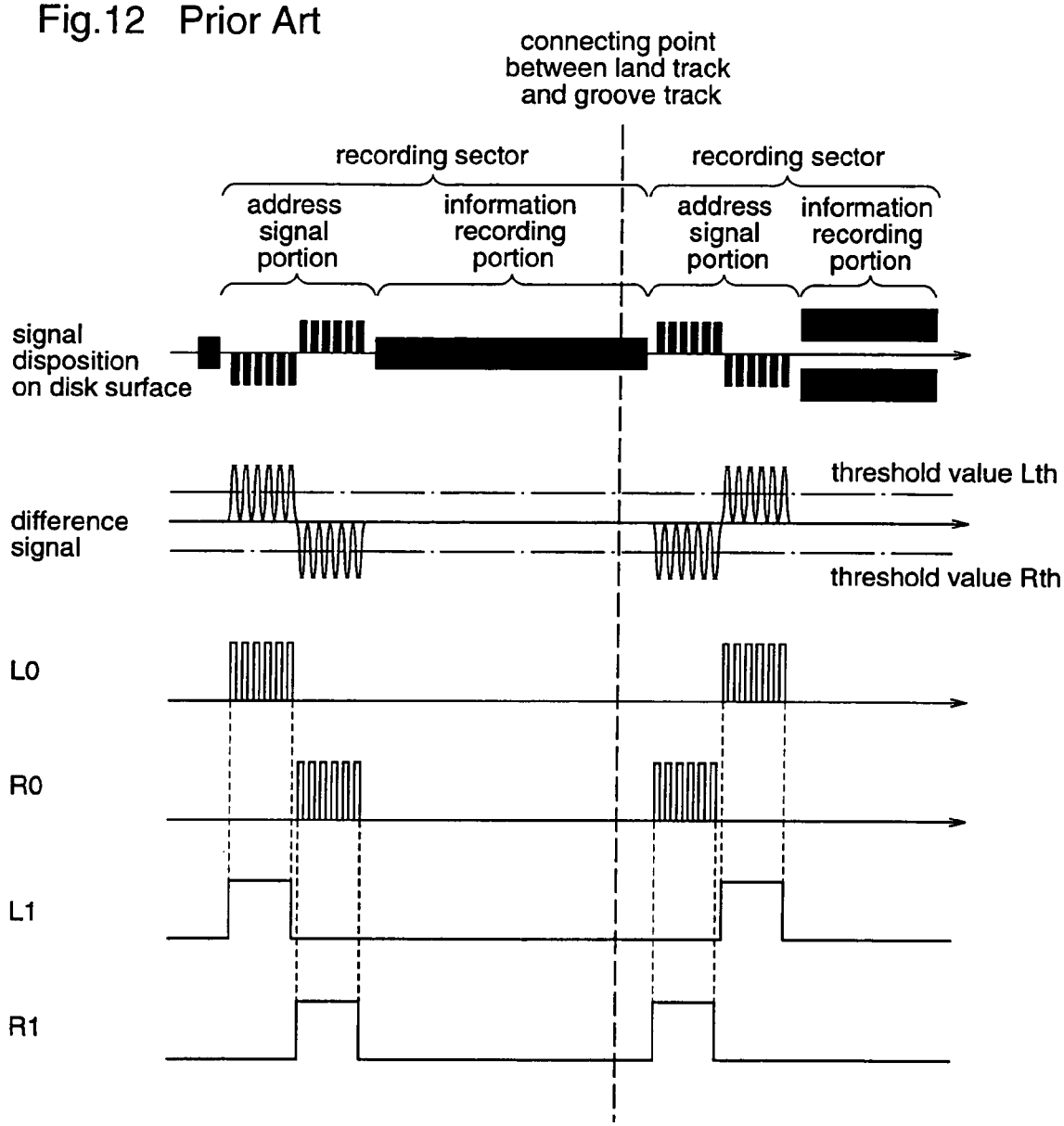
FIG. 12 is a diagram for explaining an operation of a prior art address signal position detection apparatus.

FIG. 10 is a diagram for explaining an operation of the amplitude detection circuit 60 in the address signal position detection circuit according to the third embodiment, FIG. 10(*a*) is a diagram illustrating an envelope signal detected by the amplitude detection circuit 60, and FIG. 10(*b*) is a diagram illustrating a gate signal outputted from the amplitude detection circuit 60.

The respective signals outputted from the first and second HPFs-31*a* and 31*b* are input to the amplitude detection circuit 60, in which an envelope signal as shown in FIG. 10(*a*) is detected. Then, the envelope signal is compared with a predetermined threshold value as shown in FIG. 10(*b*), and when the envelope signal has a value equal to or larger than the predetermined threshold value, it is judged that the input signal has a large signal amplitude and the gate signal of Hi is outputted. On the other hand, when the value of the envelope signal is smaller than the predetermined threshold value, it is judged that the input signal has a small signal amplitude and the gate signal of Lo is outputted.

Thereafter, the gate signal outputted from the amplitude detection circuit 60 is input to the output signal controller 36 in the phase difference detection circuit 38, and the result of the phase comparison from the phase comparator 33 is outputted only while the gate signal is Hi, and when the gate signal is Lo, that is, during a period when the amplitude detection circuit 60 judges that the input signal has a small signal amplitude, the result of the phase comparison from the phase comparator 33 is not outputted.

As described above with reference to FIG. 8, when no recording pit is formed on the data recording portion in the optical disk medium using the land/groove recording method, an incorrect phase comparison signal is sometimes generated. However, the amplitude detection circuit 60 detects a state where the input signal has a small signal amplitude, that is, a state where data are unrecorded, and does not output the result of the phase comparison from the phase comparator 33, thereby avoiding an influence of the erroneous detection.

As described above, in the address signal position detection apparatus according to the third embodiment of the present invention, the amplitude detection circuit 60 detects the envelope signal of the respective signals outputted from the first and second HPFs 31*a* and 31*b*, and the phase difference detection circuit 38 is provided with the output signal controller 36 which refers to the result of the phase comparison from the phase comparator 33 only when the value of the envelope signal is a predetermined value or more, thereby enabling the address signal position to be stably detected even when no recording pit is formed on the data recording portion in the optical disk medium using the land/groove recording method.

Then, the above-described address signal position detection apparatus according to the third embodiment can be utilized as an optical disk playback apparatus. To be specific, it is constructed as shown in FIG. 14.

Figure 14:
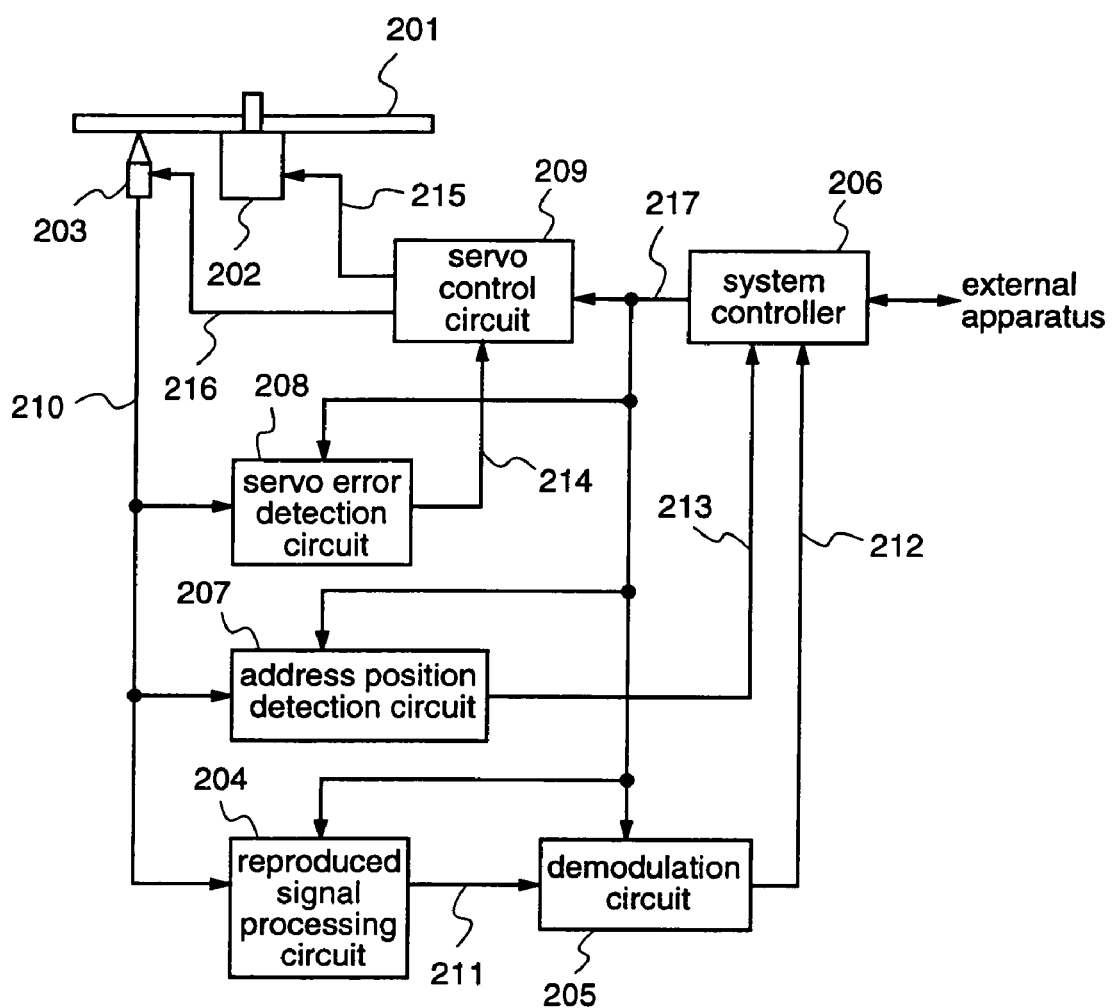
FIG. 14 is a diagram illustrating a construction of an optical disk playback apparatus including the address signal position detection apparatus according to the third embodiment of the present invention.

The optical disk playback apparatus shown in FIG. 14 comprises a spindle motor 202 for rotating an optical disk 201, an optical pickup 203 for reading a reproduced signal from the optical disk 201, a reproduced signal processing circuit 204 for reproducing data which are digitally recorded in the optical disk 201 from the output signal of the optical pickup 203, a demodulation circuit 205 for demodulating binarized data outputted from the reproduced signal processing circuit 204 and subjecting the demodulated data to error-correction, thereby to output the data recorded on the optical disk which are read as demodulated data, a system controller 206 for communicating with an external apparatus and receiving/transmitting data from/to the same as well as controlling the respective blocks, an address position detection circuit 207 corresponding to the address signal position detection apparatus described in the third embodiment, a servo error detection circuit 208 for generating a servo error signal which is required for controlling the spindle motor 202 and the optical pickup 203 on the basis of the output signal from the optical pickup 203, and a servo control circuit 209 for controlling the spindle motor 202 and the optical pickup 203 on the basis of the servo error signal outputted from the servo error detection circuit 208. Since the optical disk playback apparatus is provided with the address position detection circuit 207 corresponding to the address signal position detection apparatus described in the third embodiment, the effect that the address signal position can be stably detected even when a DC symmetry is imperfect between the forward part and the rearward part of the address information portion, can be obtained as well as even when no recording pit is formed on the data recording portion in the optical disk medium using the land/groove recording method, stable detection of the address signal position can be made.

Needless to say, the optical disk playback apparatus so constructed is applicable to the playback unit for an optical disk recording/playback apparatus or a combined apparatus of an optical disk recording/playback apparatus and a VTR or hard disk recorder, and the like.

The address signal position detection apparatus according to the present invention is useful when used for an optical disk medium typified by a DVD-RAM, in which signals are recorded in both a recessed recording track formed by a guide groove and a projecting recording track formed between the guide grooves, each recording track is composed of the integer number of recording sectors each having the same length, and an address signal portion including information such as a track address is added to a head portion of each recording sector.

What is claimed is:

1. An address signal position detection apparatus which detects a position of an address signal which is preformatted on an optical disk on the basis of output signals from photoreceptors of a pickup, the address signal position detection apparatus comprising:

a phase difference detection circuit for receiving respective output signals from the photoreceptors of the pickup and detecting a phase difference between the respective output signals;

a phase difference signal processing unit for generating an address signal position using a phase difference signal corresponding to the phase difference detected by the phase difference detection circuit; and a pattern detection circuit for detecting a pattern of a reproduced waveform from the respective output signals from the photoreceptors of the pickup;

wherein the phase difference detection circuit does not make a phase comparison when the pattern detected by the pattern detection circuit does not match a predetermined pattern.

2. The address signal position detection apparatus as defined in claim 1, wherein
the respective output signals are two sum signals, each of which is obtained by adding output signals from a pair of the photoreceptors disposed diagonally, each of the pair being fanned from among four photoreceptors of the pickup.

3. The address signal position detection apparatus as defined in claim 1, wherein
the phase difference signal processing unit includes comparators, each of the comparators having two threshold values for a + side and the a − side with respect to the phase difference signal, respectively.

4. The address signal position detection apparatus as defined in claim 1, wherein
the phase difference detection circuit detects the predetermined pattern on the basis of a recording code which is used in an optical disk which is played back.

5. The address signal position detection apparatus as defined in claim 1, further comprising
an amplitude detection circuit for detecting an envelope signal of the respective output signals from the photoreceptors,
wherein the phase difference detection circuit does not output the phase difference signal when the value of the envelope signal is a predetermined threshold value or less.

6. The address signal position detection apparatus as defined in claim 1, wherein
the optical disk is a DVD-EAM (Digital Versatile Disk-Random Access Memory).

7. An optical disk playback apparatus, comprising:
a spindle motor for rotating the optical disk;
an optical pickup for reading a reproduced signal from the optical disk;
a reproduced signal processing unit for processing the reproduced signal which is read by the optical pickup;
a demodulation unit for demodulating the signal processed by the reproduced signal processing unit and subjecting the demodulated signal to error-correction;
a servo error detection circuit for generating an error signal for servo control on the basis of the output signal from the optical pickup;
a servo control circuit for controlling the spindle motor and the optical pickup on the basis of the error signal for servo control;

an address signal position detection apparatus including a phase difference detection circuit for receiving respective output signals from photoreceptors of the pickup and detecting a phase difference between the respective output signals, a phase difference signal processing unit for generating an address signal position using a phase difference signal corresponding to the phase difference detected by the phase difference detection circuit, and a pattern detection circuit for detecting a pattern of a reproduced waveform from the respective output signals from the photoreceptors of the pickup: and a system controller for externally communicating data and controlling respective functional blocks;

wherein the phase difference detection circuit of the address signal position detection apparatus does not make a phase comparison when the pattern detected by the pattern detection circuit does not match a predetermined pattern.

8. An address signal position detection method for detecting a position of an address signal which is preformatted on an optical disk on the basis of output signals from photoreceptors of a pickup, the address signal position detection method comprising:
a phase difference detection step of receiving respective output signals from the photoreceptors of the pickup, and making a phase comparison between the respective output signals, to output a phase difference signal;
a phase difference signal processing step of generating an address signal position using the phase difference signal output in the phase difference detection step; and
a pattern detection step of detecting a pattern of a reproduced waveform from the respective output signals from the photoreceptors of the pickup;
wherein the phase difference detection step does not make a phase comparison when the pattern detected in the pattern detection step does not match a predetermined pattern.

9. The address signal position detection method as defined in claim 8, wherein the optical disk is a DVD-RAM.

* * * * *